UNITED STATES PATENT OFFICE.

JOHN J. ELBERT, OF ELIZABETH, NEW JERSEY, ASSIGNOR TO AMERICAN CYANAMID COMPANY, OF NEW YORK, N. Y., A CORPORATION OF MAINE.

PROCESS OF PURIFYING AMMONIA.

1,313,886.      Specification of Letters Patent.      Patented Aug. 26, 1919.

No Drawing.      Application filed November 5, 1918. Serial No. 261,214.

*To all whom it may concern:*

Be it known that I, JOHN J. ELBERT, a citizen of the United States, residing at Elizabeth, in the county of Union and State of New Jersey, have invented certain new and useful Improvements in Processes of Purifying Ammonia; and I do hereby declare the following to be a full, clear, and exact description of the invention, such as will enable others skilled in the art to which it appertains to make and use the same.

This invention relates to a process for making ammonia from crude calcium cyanamid, or lime nitrogen, or from cyanid compounds, and has for its object to attain this result in a manner more expeditious and less costly than has heretofore been proposed.

With these and other objects in view the invention consists in the novel steps and combinations of steps constituting my process, all as will be more fully hereinafter disclosed and particularly pointed out in the claims.

In order that my invention may be clearly understood it is said:—In U. S. Patent #776314, process of making ammonia, Nov. 29, 1904, to Frank; and in particular U. S. Patent #1149653, process of making ammonia from calcium cyanamid, dated Aug. 10, 1915, to W. S. Landis; in #1154640, process of producing ammonia, dated Sept. 28, 1915, to W. S. Landis; and in #1163095, process of making ammonia from calcium cyanamid, dated Dec. 7, 1915, to W. S. Landis, there are described processes for the production of ammonia from calcium cyanamid, commonly found in the market in a crude form called cyanamid or lime nitrogen. The ammonia produced by these prior processes varies from a pure material to one containing a greater or less quantity of impurities. These said impurities are derived from the original lime nitrogen, for the commercial form of lime nitrogen contains compounds which yield these said impurities during the process of transformation into ammonia.

The principal impurity of the lime nitrogen is undecomposed carbid due to an incomplete nitrification of the large masses of said carbid that are charged into the nitrifying ovens. Under normal operating conditions the quantity of this residual carbid is usually very small, but under emergency conditions incident to irregularities of plant operation, of raw material supply, and more particularly of overload capacity of the plant, it may become quite appreciable running up to several per cent. of the weight of the lime nitrogen used.

Further, the raw materials, coke and lime used in the manufacture of the carbid are never either pure forms of carbon or of calcium oxid. Various impurities such as sulfur and phosphorus, magnesia, silica, alumina, etc., are found in both of these raw materials; and when the latter pass through an electric furnace these impurities undergo various transformations and consequently appear in the lime nitrogen in the form of various compounds.

Accordingly, lime nitrogen when treated for the production of ammonia, undergoes a decomposition, and certain of these impurities produce volatile compounds which appear in the ammonia gas.

In the usual method of producing ammonia from lime nitrogen the recovered liquor from a previous operation is charged into the autoclave and this is followed by a slow feeding of lime nitrogen into the liquor, accompanied by constant agitation of the mixture, with or without the addition of an alkali. This procedure causes an evolution of impurities such as acetylene, phosphin, silicon hydrid, and other similar volatile compounds which are largely removed before actually closing up the ammonia autoclave. But a portion of these impurities dissolve in the relatively large volume of liquor in the autoclave, and remain in solution until after the pressure vessel is closed and a further portion of them may even remain undecomposed for some little time even though they are in the presence of the solutions in the autoclave.

When the autoclave is closed, the steam turned on, and the contents heated, the gaseous impurities in solution are liberated, together with final decomposition, or residual products. These said impurities are therefore evolved and pass off with the ammonia, contaminating the same and influencing its use for certain purposes.

It is true the quantity of such impurities is extremely small being usually measured not ordinarily in percentage but rather in terms of parts per million of ammonia gas; but in certain cases it is of marked advantage to remove them before using the ammonia. Under extremely rapid working such as most ammonia plants are forced to adopt under present conditions, proper time for the charging of the lime nitrogen and liberation of these gases, is not available; and therefore, in such cases it is not infrequent to find several times the quantity of these impurities present in the ammonia as would be found under normal working conditions.

I have developed a process of removing these impurities in a comparatively simple manner as follows:—

Example I: Ammonia gas as delivered by the autoclave is found to be mixed not only with the impurities above mentioned, but also with steam. Therefore, I first pass this ammonia gas through a suitable rectifying tower equipped with a dephlegmator and a condenser whereby I obtain a comparatively dry ammonia gas, for the latter will be found to be saturated only with water vapor to the extent permitted, under the temperature conditions at which the condenser is operated. This comparatively dry ammonia gas with its impurities is next passed through any suitable, or ordinary scrubbing apparatus, and there washed with an ammoniacal solution of cuprous chlorid, whereupon the acetylene will be removed as copper acetylid; and the phosphin will be removed as a corresponding phosphid, or similar compound, together with part of the sulfur, silicon and other impurities.

I may next wash the gas coming from this scrubber with oil, preferably paraffin oil whereupon any organic sulfur compounds and similar impurities that may be present will be further removed and the resulting product will be pure ammonia gas.

Example II: In case aqua ammonia has been made from the gas derived from the cyanamid by either totally condensing the discharge from the autoclave, or preferably by a process of rectification, condensation and absorption I remove a large fraction of the impurities present by causing them to pass on with the uncondensed and unabsorbed gases. There will, however, remain in the aqua-ammonia a fraction of the original impurities which came over with the said ammonia gas. Therefore, I next treat this aqua-ammonia with cuprous chlorid whereupon the acetylene, the phosphin and similar impurities are eliminated by precipitation. The resulting purified aqua-ammonia is next distilled for the production of ammonia, and the resulting ammonia gas washed with oil to remove the remaining impurities. By this treatment an extremely pure ammonia can be produced suitable for oxidation into nitric acid, the production of the highest grade aqua-ammonia or of anhydrous ammonia. Cyanid compounds capable of yielding ammonia in an autoclave may be used as a raw material instead of cyanamid compounds.

It is evident that those skilled in the art may vary the details of the above procedure without departing from the spirit of the operation, and I therefore, do not wish to be limited to my invention, other than may be required by the claims.

What I claim is:—

1. The process of preparing pure ammonia from ammonia produced from impure cyanamid or cyanid compounds by autoclaving, consisting in rectifying and removing water from the ammonia gas discharged from the autoclave; and treating the residual gas with cuprous chlorid and oil, substantially as described.

2. The process of purifying ammonia obtained from the autoclaving of cyanamid or cyanid compounds, consisting in removing moisture from the gas discharged from the autoclave; and scrubbing the gas consecutively with cuprous chlorid and paraffin oil substantially as described.

In testimony whereof I affix my signature, in presence of two witnesses.

JOHN J. ELBERT.

Witnesses:
 ALICE E. STRAND,
 GEORGE E. COX.